United States Patent [19]

Lindwall et al.

[11] Patent Number: 4,595,299
[45] Date of Patent: Jun. 17, 1986

[54] APPARATUS FOR CONTACTLESS MEASUREMENT OF TEMPERATURE

[76] Inventors: Reine Lindwall, Ärenprisvägen 79, S-59062 Linghem; Leif Samuelsson, Fredriksberg Värna, S-58590 Linköping, both of Sweden

[21] Appl. No.: 704,225

[22] Filed: Feb. 22, 1985

[30] Foreign Application Priority Data

Feb. 24, 1984 [SE] Sweden .................... 8401025

[51] Int. Cl.⁴ .................... G01K 13/06; G01K 1/16
[52] U.S. Cl. .................... 347/153; 374/135
[58] Field of Search .............. 374/120, 133, 135, 138, 374/148, 153; 72/13, 286

[56] References Cited

U.S. PATENT DOCUMENTS 2,204,797  6/1940  Fearn .................... 374/120
3,191,437  6/1965  Heard, Jr. .................... 374/153

FOREIGN PATENT DOCUMENTS 266279  3/1970  U.S.S.R. .................... 374/120

Primary Examiner—Charles Frankfort
Assistant Examiner—Patrick R. Scanlon
Attorney, Agent, or Firm—Pollock, Vande Sande & Priddy

[57] ABSTRACT

Apparatus for measuring the temperature of an elongated movable object such as a wire or wire-rod exiting from a draw plate during a wire drawing process. The wire is located in a column-like chamber which is defined by two vertical walls and through which an upwardly moving flow of gas passes. A temperature sensor is mounted above and beneath the wire and the temperature difference in the gas is determined with the aid of a differential amplifier. The sensors may be thermistors or preferably thermocouples, which in the latter case are coupled with counteracting thermo-voltages for direct compensation and an output voltage proportional to the temperature difference.

5 Claims, 4 Drawing Figures

APPARATUS FOR CONTACTLESS MEASUREMENT OF TEMPERATURE

FIELD OF THE INVENTION

The invention relates to apparatus for determining the temperature of an elongated axially movable object in contact-free fashion, and more particularly for determining the temperature of wire or wire-rod exiting from a wire-drawing die arranged in a draw plate incorporated in a wire-drawing bench, in wire manufacturing processes, heat emitted by the object being caused to heat a by-passing fluid whose temperature is measured with the aid of a temperature sensor.

The invention is particularly, although not exclusively, intended to solve in wire-drawing processes the problems of determining the temperature of the wire or wire-rod under manufacture. In short, wire-drawing processes involve drawing wire-rod through a series of dies in a draw plate incorporated in a draw bench, therewith to reduce the diameter of the wire-rod. As the diameter of the wire-rod is reduced upon passage through a die, heat is generated by both the internal friction in the material and the external friction therein, this latter friction being maintained within reasonable limits with the aid of lubricants. Thus, during a wire-drawing process it is possible, inter alia, to monitor the tensile force applied to the rod, the wire-drawing rate, and the supply of lubricant. In order to fully monitor the process, however, it is highly desirable to be able to follow the course of heat generation. For example, a fall in the supply of lubricant can result in high temperatures, before the wire-rod subsequently breaks, causing an interruption in manufacture. Moreover, better temperature control will result in higher and more uniform wire qualities.

BACKGROUND OF THE INVENTION

Among measuring methods previously proposed in this context can be mentioned the measurement of the thermotension between draw plate and wire-rod, the measurement of the refractive index of the air (Schlieren-methods), resistance measurement (Pirani-principle), thermoelectrical measurement via slide contacts, etc. One method some times applied in the present context is the pyrometric method, in which the black-body temperature of the wire-rod is determined. However, since, among other things, the wire or wire-rod does not function as a black body, it is often necessary to employ complicated two-beam pyrometers or multi-beam pyrometers. Since the temperatures concerned are low from a pyrometric aspect (room temperature to 150° C.) such equipment becomes expensive. In addition it must operate in a dirty environment, which further increases the difficulties. Consequently, no completely practical temperature gauge which is well suited to production conditions has hitherto been available.

British Patent Specification No. 1,334,178 describes apparatus for determining the temperature of an elongated object in contact-less fashion. The apparatus is of the kind described hereinabove and is able to measure the temperature of a plate, which may be moveable. Arranged on one side of the plate is a nozzle-equipped device, from which gas is directed onto the surface of the plate through a circular array of nozzles, there being centrally arranged a suction nozzle which aspires part of the gas through a tube having a temperature sensor mounted therein. The apparatus is intended for ovens, furnaces and the like. This apparatus is not considered suitable for use in connection with more elongated objects, and not at all in conjunction with wire-drawing processes.

SUMMARY OF THE INVENTION

The problems mentioned above are solved, in accordance with the invention, with the aid of apparatus comprising a closed box having mutually opposite short walls in which are located two holes for the through-passage of the elongated, movable object; two first vertical walls which extend substantially parallel with the longitudinal axis of the object; and means for organizing an upwardly passing gas stream through the box past the elongated object, in a chamber defined by the aforesaid first walls and substantially at right angles to the longitudinal axes of the object, the temperature sensor being mounted above the object so as to measure the temperature of gas passing beyond said object. Because the gas has the form of a stream, the convection effect obtained as a result of heating the gas can be overcome.

In a preferred embodiment of the invention, additional vertically extending flow chambers are arranged on both sides of the chamber through which the movable object passes, and in which additional chambers gas derived from the same gas source is caused to pass upwardly, wherewith a reference temperature can be taken in at least one of the chambers. This advantageously provides the possibility of compensating for error factors, since it is possible to determine a difference in temperature of the gas which has passed the object, thereby providing a good measurement of the temperature of said object. A reference sensor can also be placed in the gas stream upstream of the object, although it must be ensured in such a case that radiation heat does not produce an error-creating influence.

In accordance with a particularly advantageous embodiment of the invention, there is provided a first flow chamber for passage of the object through upwardly flowing gas, and on both sides thereof a respective second flow chamber in which gas also flows upwardly, and externally of these respective second flow chambers, on respective sides thereof, third flow chambers into which gas is injected to flow downwardly therein and to turn for upward flow through the first and the second flow chambers. The third flow chambers are suitably defined upwardly by means of insulated outer box-walls, the box thus being divided into five vertically extending column-like spaces or chambers. In this way the influence of the ambient temperature will be minimal, which is an advantage.

It will be understood that although the temperature measured in the flowing gas above the object is not the same as the temperature of the movable elongated object, it does nevertheless constitute an essentially precise function of said temperature. In order to achieve good reproducibility, the gas flow should be regulated constantly, for example by controlling the same with the aid of a reliable reduction valve.

BRIEF DESCRIPTION OF THE DRAWINGS

The invention will now be described with reference to the accompanying drawings, in which an emodiment of the invention is shown for purposes of illustrtion, and in which.

DETAILED DESCRIPTION

Figure 1:
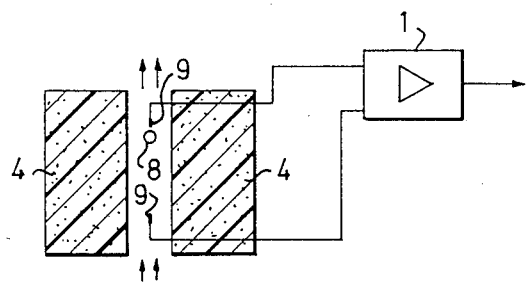
FIG. 1 illustrates schematically an embodiment of the invention.

FIG. 1 illustrates an extremely simple embodiment of substantially principle design. The embodiment comprises two vertical insulating walls 4 made of cellular plastics and lined with aluminum foil. The walls 4 are spaced apart to form therebetween a vertical space or chamber through which a stream of air produced from a pressurized-air nozzle is arranged to pass. Arranged in the path of the air stream is a horizontal wire 8. First and second thermistors 9 are arranged respectively above and beneath the wire 8. Each of the thermistors 9 is connected to the input of a respective operational amplifier 1, the output signals of which are connected to a differential amplifier.

Figure 4:
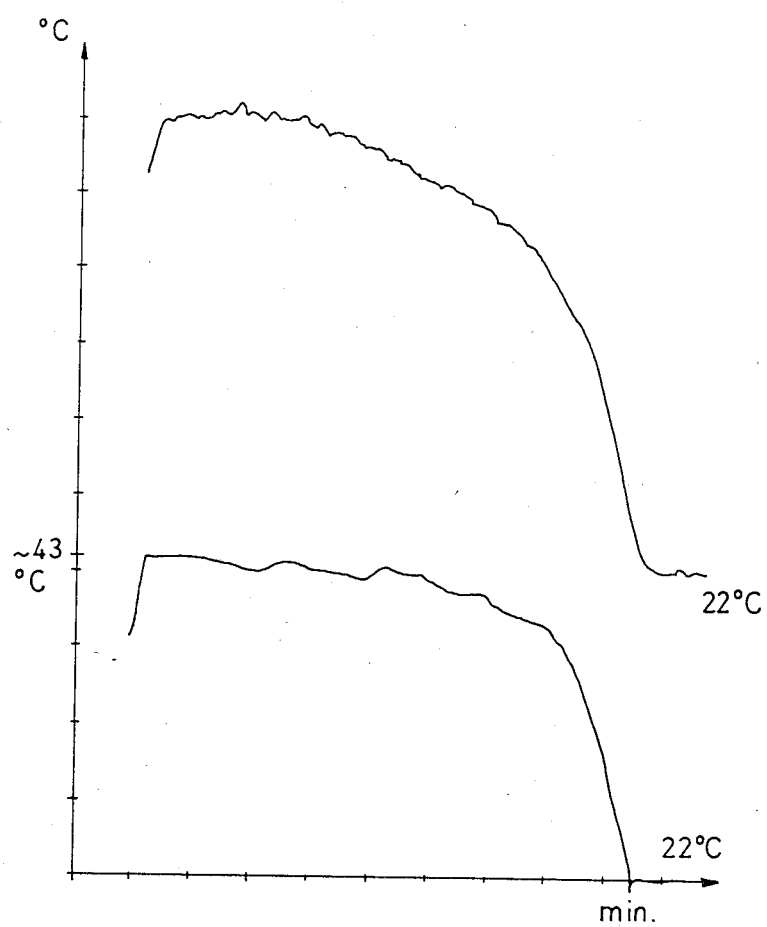
FIG. 4 illustrates the result of a step response trial.

A test carried out with apparatus of this embodiment produced the result shown in FIG. 4, where the time axes is directed from right to left. A wire or wire-rod provided with a thermocouple was mounted in position so as to enable the temperature of the wire to be measured. An electric current was passed through the wire, the temperature of which increased in the space of a minute from room temperature, 22° C. to 43° C. The apparatus responded hereto with full indication for about 1.5 min.

In a further test, the same apparatus was mounted on a draw bench in a wire drawing section. An annealed and pickled wire-rod made of SS steel 2331 and coated with lubricant carrier was drawn through a single block and reduced in diameter from 0.68 to 0.62 mm (a 17% reduction in area), using stearate as a drawing lubricant. When varying the rate at which the wire was drawn and altering the supply of lubricant thereto, a clear indication was quickly obtained of the resulting changes in temperature of the wire-rod leaving the draw plate. This first prototype itself was adjudged to be useful as a monitoring instrument under production conditions.

Figure 3:
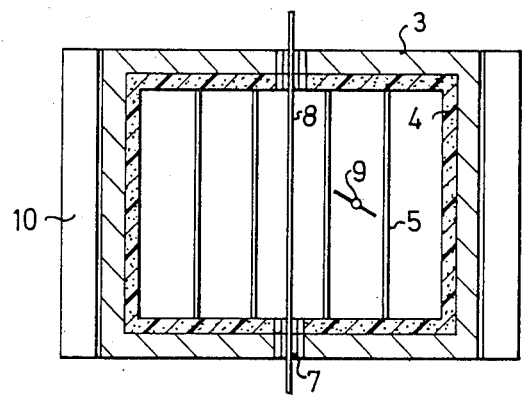
FIG. 3 is a horizontal sectional view taken on the line III—III in FIG. 2.
Figure 2:
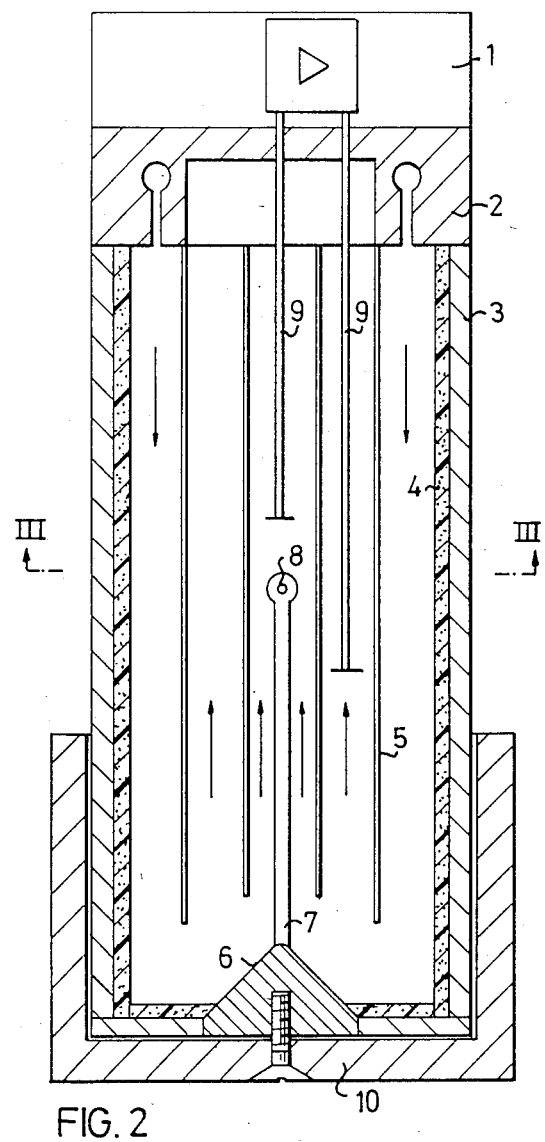
FIG. 2 is a vertical sectional view of a preferred embodiment.

FIGS. 2 and 3 illustrate a more developed embodiment of the invention, shown approximately to a scale of 2:1.

Seated on a holder 10 is a detector housing in the form of a box having external walls 3 provided with insulating layers 4. Provided at one end is a cap or lid means 2 in which gas inlet passages are arranged. Mounted within the box are four further walls 5, which are made of thin metal plate of good thermal conductivity (e.g., copper or aluminum), and which are connected at the top of the box but terminate at a distance from the bottom thereof, above the holder 10. Air entering through the passages in the cap means 2 flows downwardly in the two outermost channels until it reaches the bottom, when it is turned by a gas deflector 6 and continues upwardly through the three column-like channels formed by the four walls 5, and finally discharges into a collecting chamber high up in the top piece, as illustrated in FIG. 2. A suitable gas flow rate is 1-2 m/s.

To enable the apparatus to be readily mounted on and removed from, for example, a wire drawing machine in a simple fashion, the box is provided on the end sides thereof with open slots 7, which are enlarged at the ends thereof to enable the wire or wire-rod 8 to move slightly in all directions as it passes through.

Arranged in the channel through-passed by the wire is a first thermosensor 9, while a second thermosensor 9 is arranged in one of the side channels. The sensors comprise thermocouples made of so-called Thermocoax. Arranged within an inconel tube having an outer diameter of 2 mm are filaments of chromel and alumel (diameter about 0.2 mm), these filaments being embedded in an insulating bed (magnesium oxide). These conductors are relatively inflexible and can be made self-supporting. The two filaments are spot-soldered together at the ends thereof against small metal tabs, which constitute the soldering site. With the detector unit 1, the filaments are joined together (not shown) in a manner such that their thermoforces compensate one another, leaving two output conductors which are coupled to an operational amplifier of low drift and low offset. In relation to a coupling with thermistors, as with the first embodiment, requiring a constant current source, two amplifiers and a differential amplifier, the coupling of the second embodiment is less sensitive to interruptions and drift, even when the strength of the primary signal is lower. In this way there is obtained a stable and non-sensitive measuring circuit.

The apparatus can be cleaned very easily and is, in other respects, highly insensitive to, for example, the surrounding dirt and dust which unavoidably forms during manufacture. The apparatus is also very inexpensive in relation to pyrometric assemblies based on radiation, these assemblies also having other disadvantages in addition to that of cost.

It will be observed that, in the embodiment illustrated in FIGS. 2 and 3, the two sensors are placed in flowing gas in spaces or chambers which are substantially equivalent with respect to the geometry of the gas flow. Before the gas reaches the sensors an equality has been reached, with subsequent thermo-equilibrium. In the main, the thermosensors detect the gas temperature, and, should a minor part of radiation temperature be detected by the sensors seated above the wire or wire-rod, this contribution will solely act on the output signal in the same sense as the elevated temperature. The output signal will vary monotonously with the temperature, although not linearly.

The invention provides an instrument which is particularly suitable for improved process control in respect of different manufacturing processes, such as wire drawing, wire-rod and sheet rolling, and other fields of use. In the case of wire drawing processes, there is a very great need of being able to control and document manufacture. With such an apparatus, it is firstly possible to monitor the wire or wire-rod exiting from the draw plate and to signal the operator each time the temperature rises above a given level, indicating an abnormal course of events, e.g., a malfunction in the lubricating system. Secondly, the speed with which the wire-rod is drawn can be controlled to obtain a constant degree of heating in the process and therewith guarantee previously unattained uniformity in mechanical strength properties (tensile strength and elasticity modulus), thereby increasing the degree of refinement of the product, its quality and its retail value.

What we claim is:

1. Apparatus for the contactless measurement of the temperature of an elongated, narrow and axially movable object, and in particular for measuring the temperature of wire or wire-rod exiting from a draw plate in a draw bench in a wire drawing process, said apparatus comprising
  (a) a closed box having two openings, located in mutually opposite short walls for passage of the object;
  (b) two first vertical walls extending substantially parallel with the longitudinal axes of the elongated object and located on opposite sides of the elongated object;
  (c) means for organizing an upward flow of gas in a first chamber between the first walls and substantially at right angles to the longitudinal axes of the object;
  (d) a first temperature sensor arranged in the upward flow of gas downstream of the object and a second temperature sensor arranged to detect the temperature of the gas flow in an area uninfluenced by the temperature of said object;
  (e) wherein the openings have the form of slots located in said short walls, reaching down to a respective end side of the short walls and enabling the closed box to be straddled over the object; and
  (f) wherein outwardly of the first vertical walls and on both sides of said first chamber there are arranged second vertical walls which define between themselves and respective first vertical walls two second chambers, said means for organizing said air flow being arranged to create an upward flow of gas through both said first chamber and said two second chambers, and the second temperature sensor is mounted in one of said second chambers.

2. Apparatus according to claim 1, further comprising two third walls arranged outwardly of the second vertical walls and terminating at the bottom of the box and defining with said second walls third chambers which communicate with said first and said second chambers through the space remaining between the bottoms of the second walls and said box bottom, wherewith the means for organizing the gas flow are arranged to pass gas to the upper parts of the third chambers, for downward passage through the third chambers and upward passage through the first and the second chambers.

3. Apparatus according to claim 1, wherein the first and the second walls comprise thin metal sheet of good thermal conductivity, for example copper or aluminum, said walls being connected to the top of the box but terminating short of the bottom thereof.

4. Apparatus according to claim 1, wherein the box comprises a removable upper section, wherein the short walls having slots are included in the upper section, and a bottom section on which the upper section can be placed.

5. Apparatus according to any one of the preceding claims, wherein the first and second walls form intermediate walls in said box.

* * * * *